United States Patent

Adler et al.

[15] 3,700,903
[45] Oct. 24, 1972

[54] OPTICAL DETECTING SYSTEMS FOR SENSING VARIATIONS IN THE LATERAL MOTION OF LIGHT RAYS

[72] Inventors: Robert Adler, Northfield; Adrianus Korpel, Prospect Heights, both of Ill.

[73] Assignee: Zenith Radio Corporation, Chicago, Ill.

[22] Filed: Dec. 9, 1970

[21] Appl. No.: 96,581

Related U.S. Application Data

[63] Continuation of Ser. No. 763,682, Sept. 30, 1968, abandoned.

[52] U.S. Cl. ............250/217, 178/7.8, 250/219 WE, 356/120, 356/211
[51] Int. Cl. ....G01b 11/30, G01n 21/30, G01n 21/48
[58] Field of Search.250/216, 217, 219 FR, 219 WE, 250/219 DF, 231, 230; 356/120, 211; 178/7.8

[56] References Cited

UNITED STATES PATENTS 3,510,664    5/1970    Nichols..................250/217 R Primary Examiner—James W. Lawrence
Assistant Examiner—T. N. Grigsby
Attorney—John J. Pederson

[57] ABSTRACT

An instrument is described which renders Rayleigh or surface waves visible on a television screen. A flying spot scanner uses a laser beam to scan a substrate horizontally and vertically at standard television rates. The periodic tilting or warping of the surface caused by the passage of an acoustic wave modulates the light reflected from the surface. This modulation is picked up by a photocell, filtered, amplified and heterodyned with a reference signal taken from the sound generator. The resulting difference signal reproduces the surface wave pattern on the television screen, with the waves standing still as if their motion had been arrested by a stroboscope. Normally visible features of the substrate may also be reproduced to serve as background. In a further embodiment, the system is expanded to provide for recording of acoustic holograms.

4 Claims, 6 Drawing Figures

Inventors
Robert Adler
Adrianus Korpel
By John J. Pederson
Attorney

PATENTED OCT 24 1972 3,700,903

Inventors
Robert Adler
Adrianus Korpel
By *Jno. J. Pederson*
Attorney

OPTICAL DETECTING SYSTEMS FOR SENSING VARIATIONS IN THE LATERAL MOTION OF LIGHT RAYS

CROSS REFERENCE TO RELATED APPLICATION

This application is a continuation of copending application, Ser. No. 763,682, filed Sept. 30, 1968 (now abandoned), assigned to the assignee of this application.

BACKGROUND OF THE INVENTION

This invention relates to electro-optical apparatus and systems.

Rayleigh or surface waves of sufficiently high intensity can be made visible by purely optical processing methods, without electronic amplification, but the minimum acoustic intensity required to permit such direct observation is relatively high, of the order of 100 milliwatts per centimeter at acoustic frequencies in the range from 5 to 10 megahertz. Certain types of acoustic surface wave devices, such as solid-state filters and delay lines for example, operate with acoustic intensities of less than 1 milliwatt per centimeter. There has previously been no practical apparatus for direct observation of diffraction, interference, changes in phase velocity and other surface wave phenomena at such low acoustic intensities.

It is therefore a principal object of the present invention to provide a new an improved electro-optical apparatus for permitting direct observation of such surface wave phenomena at extremely low acoustic intensities.

It is a more general object of the invention to provide a new and improved electro-optical apparatus for deriving information concerning visually imperceptible movement of an object surface.

In accordance with the present invention, new and improved optical apparatus comprises a laser for generating a coherent light beam, and an optical scanning system for causing the light beam to scan an object surface in accordance with a predetermined repetitive scanning pattern. Means including a photo-detector responsive to light reflected from the object surface are provided for developing an output signal, and the apparatus further comprises optical means for imaging the exit pupil of the scanning system onto the output signal developing means.

Further in accordance with the invention, new and improved optical apparatus comprises a laser for generating a coherent light beam and an optical scanning system for causing the light beam to scan an object surface in accordance with a predetermined repetitive scanning pattern. Means responsive to variations in the lateral motion of light rays reflected from the surface are provided for determining a characteristic of the surface.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
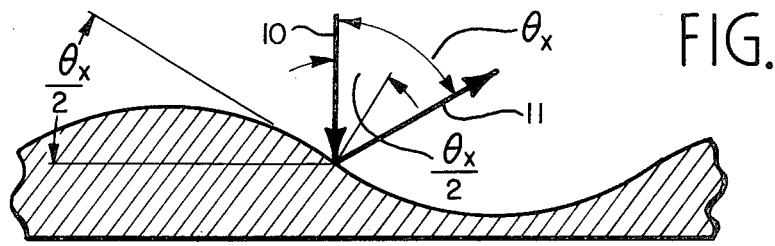
FIGS. 1 and 2 are enlarged fragmentary side elevational views showing in idealized and simplified form on a greatly exaggerated scale how variations in reflection angle and reflected beam focus result when a surface wave is propagated on a substrate.

Optical systems are known in which a laser beam is directed at an object surface and phase variations in the returned or reflected beam are detected by optical heterodyning with a reference beam derived from the illuminating beam. Such systems, for example, are used in light communication systems and the like. By way of contrast, systems embodying the present invention do not employ optical heterodyning but instead provide for the detection of variations in transverse distribution, either from lateral motion or focus variations, of a reflected beam. With the propagation of surface waves on a substrate, incremental portions of the surface are tilted and warped in accordance with the impressed surface wave function. FIG. 1 illustrates in idealized and schematic form how an incident collimated light beam represented by a singe ray 10, upon encountering a surface instantaneously tilted at an angle $\theta_x/2$ with respect to the surface plane as a result of the impression of surface waves, is reflected as indicated by the ray 11 at an angle $\theta_x$ with respect to the incident ray 10, since the angle of reflection is always equal to the angle of incidence. As the slope or angle of tilt $\theta_x/2$ at the point of incidence of light ray 10 changes in time due to the propagation of surface waves, corresponding changes in the total reflection angle $\theta_x$ are also produced and this results in lateral deflection or transverse motion of the reflected beam 11.

Figure 2:
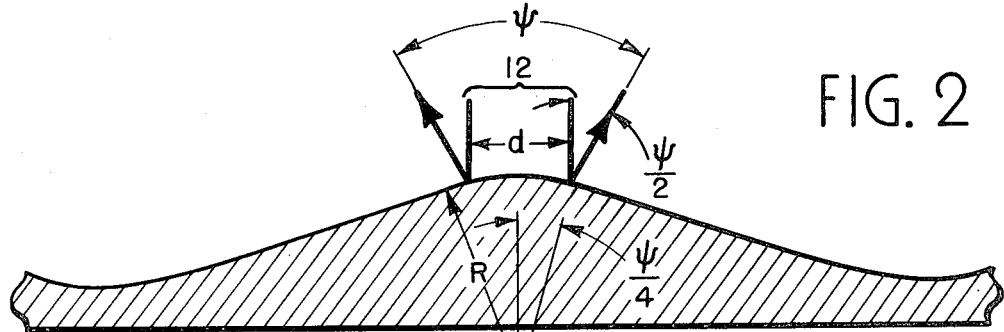

In addition, variations in the angle of convergence or divergence of the reflected beam are produced by variations in the warp of the object surface, as shown in FIG. 2. In FIG. 2, an incident collimated light beam 12 of finite width $d$, upon encountering an incremental surface area having a radius of curvature R, gives rise to a divergent reflected beam whose angle of divergence $\psi$ is determined by the radius of curvature R of the surface area intercepted by incident beam 12. If the incident beam instantaneously intercepts a trough rather than a crest, the radius of curvature R becomes negative in sign, and a convergent reflected beam is produced.

Figure 3:
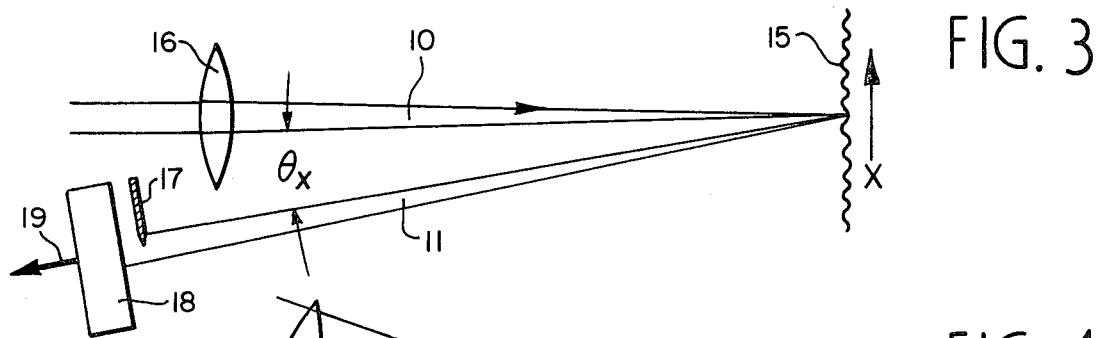
FIGS. 3 and 4 are idealized enlarged views of electro-optical systems embodying the invention for detecting tilt and warp, respectively, of an object surface.

In accordance with the present invention, variations in lateral motion of the reflected beam 11 (FIG. 1) and/or variations in the angle $\psi$ of convergence or divergence of the reflected electron beam (FIG. 2) are detected to produce an electrical output signal which may be employed in any useful manner. As shown in FIG. 3, the incident light beam 10 is focused on the object surface 15 by an appropriate optical focusing system schematically represented by convex lens 16, and the reflected beam 11 is swept back and forth across the edge of an opaque intercepting element 17 which is followed by a photodetector 18. As the total reflection angle $\theta_x$ varies, the transverse intensity distribution, more specifically the lateral position, of the reflected beam 11 varies correspondingly, permitting more or less of the reflected light to reach the photo-responsive surface of photodetector 18. The photo-detector develops a corresponding electrical output signal at output terminal 19.

Figure 4:
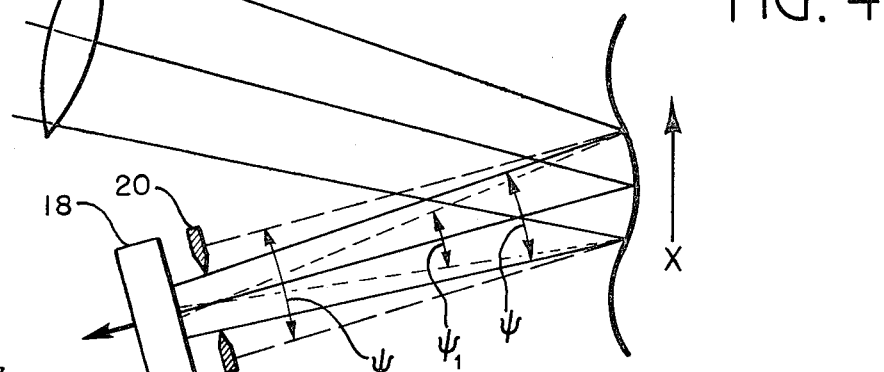

The system of FIG. 4 is employed to detect variations in the warp of the object surface 15, and is similar to the detecting system of FIG. 3 except that a centrally apertured opaque intercepting element 20 is substituted for the intercepting edge 17. Focusing system 16 is designed to produce a spot of finite size but small relative to the acoustic wavelength of the surface wave perturbations to be detected. As the angle of convergence or divergence $\psi$ varies between its limiting values $\psi_1$ and $\psi_2$, the proportion of the reflected light which passes through the aperture of intercepting element 20 and reaches photodetector 18 also varies accordingly.

The detecting system of FIG. 3 is responsive only to the component of lateral deflection of the reflected beam in a plane perpendicular to the edge of intercepting element 17. In the detecting system of FIG. 4, if the aperture in intercepting element 20 is in the form of a slit, the system responds only to changes in that component of the angle of convergence or divergence in the plane perpendicular to the slit of the intercepting element 20. On the other hand, by providing intercepting element 20 with an aperture bounded on all sides with opaque material, the system may be made sensitive to all components of surface wave motion at the object surface.

Thus in summary, when a beam of coherent light is reflected from an object surface which is acoustically agitated by the transmission of acoustic Rayleigh waves or surface waves, the reflected beam is modified in three ways. First, the reflected beam contains phase angle variations representative of the small variations in surface height at the reflection area; such variations are detectable by optical heterodyning systems as is well known in the art.

Secondly, the reflected beam is laterally deflected in response to variations in the slope or tilt at the reflection area. Such lateral motion of the beam is detected, in systems embodying the present invention, by sweeping the beam across the edge of an opaque intercepting element followed by a photodetector.

Thirdly, the reflected beam is defocused because of varying curvature or warp of the object surface at the reflection area. Variations in defocusing of the reflected beam are detected, in systems embodying the present invention, by directing the reflected beam to a slitted or apertured opaque intercepting element followed by a photodetector (or alternatively to a limited-area photodetector of appropriate size and location) so that focusing variations in the reflected beam result in corresponding variations in the light flux illuminating the photodetector surface.

Figure 5:
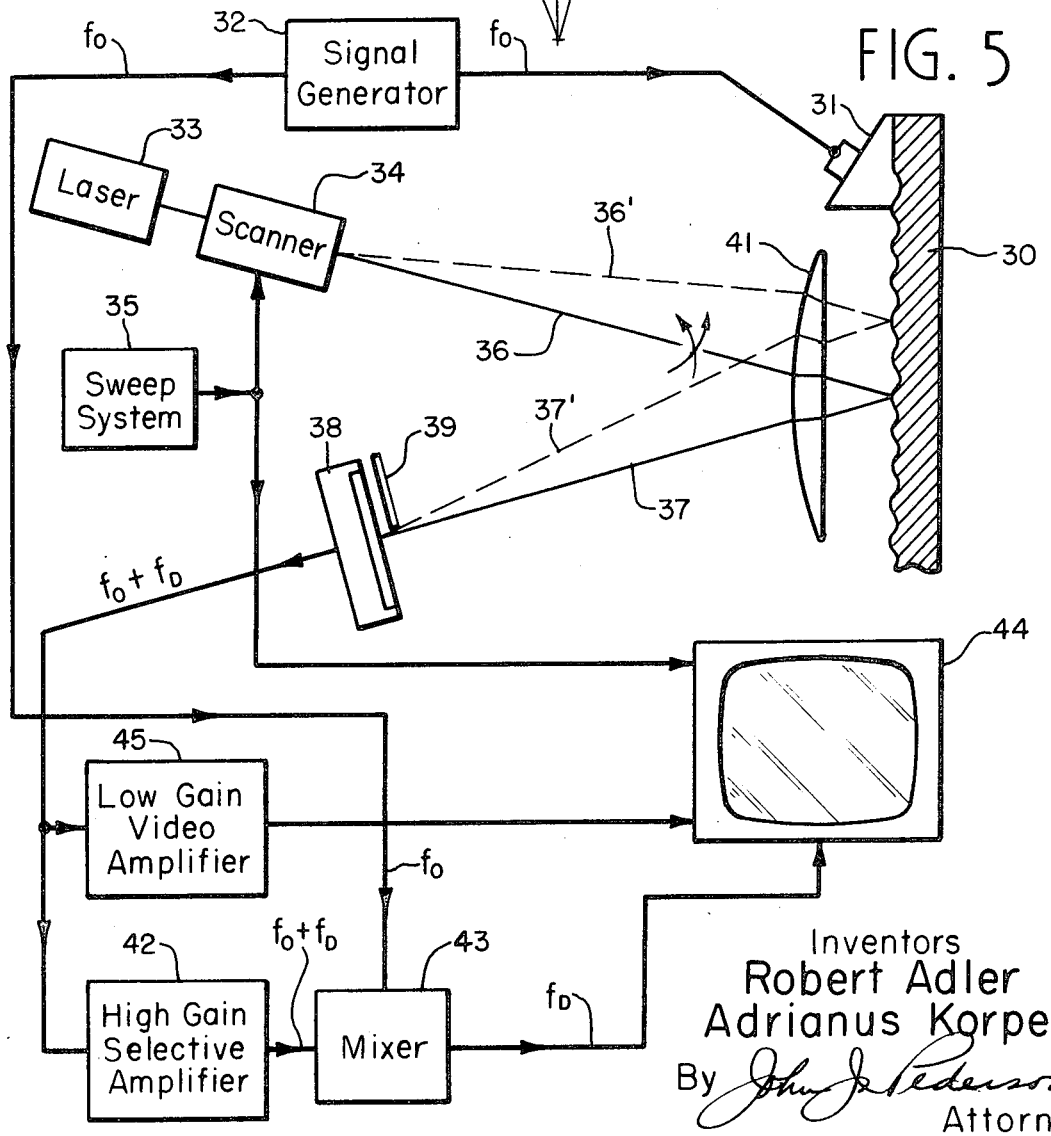
FIG. 5 is a schematic diagram of electro-optical apparatus embodying the present invention for visualizing surface waves.

FIG. 5 shows in schematic form a novel apparatus for the visualization of surface waves on a substrate 30, which may be, for example, of a piezoelectric ceramic material such as lead zirconate titanate (PZT). Such a substrate, with input an output surface wave transducers at spaced locations on the surface, may be used, for example, as a frequency-selective filter or as an ultrasonic solid state delay line. In such an environment, the active surface is ground and lapped as nearly flat as possible, and to improve the sensitivity of the surface wave visualization apparatus, the surface may be coated with a highly reflective layer of polished metal, such as gold. In the schematic showing of FIG. 5, the input surface wave transducer 31 is shown in contact with the active or forward surface of substrate 30; a similar output transducer (not shown) may be similarly coupled to the active surface at any desired location spaced from input transducer 31. Input transducer 31 receives an applied input signal at a predetermined frequency $f_0$ from a suitable signal generator 32.

The apparatus further comprises a laser 33 for producing a coherent monochromatic light beam of the wavelength $\lambda$ which may be within either the visible or the invisible light spectrum, and a scanning system 34 controlled by a sweep system 35 to cause the light beam from laser 33 to scan an image raster which may, for convenience, correspond to the scanning raster of a standard television image. Scanner 34 may, for example, be constructed in the manner described in an article entitled "A Television Display Using Acoustic Deflection and Modulation of Coherent Light" by A. Korpel, R. Adler et al., published in APPLIED OPTICS, Volume 5, No. 10, October 1966, pages 1667 to 1675. Thus, laser 33, scanner 34, and sweep system 35 constitute a flying spot laser scanner for causing a focused beam 36 of collimated light to scan the object surface of substrate 30 in a conventional television image raster pattern.

The apparatus illustrated in FIG. 5 comprises a deflection-responsive detector of the type shown in FIG. 3, for developing an output signal in response to variations in the lateral or of deflection of the return beam 37 reflected from the object surface of substrate 30. The detecting system comprises a photodetector detector 38 preceded by an opaque intercepting element 39 having a knife edge which intercepts half of the reflected beam 37 when the object surface is not acoustically actuated (i.e., with no signal from generator 32). In order to assure that the return beam is always properly imaged onto the knife edge at all points in the raster scan, a spherical correcting lens 41 is placed immediately in front of the surface under examination. Lens 41 images the exit pupil of the scanning system onto the knife edge 39; the action of lens 41 is apparent from the dotted outgoing and return beam paths 36' and 37' illustrating an alternate scanning position.

During the scanning process, the light beam from the flying spot laser scanner sweeps across the substrate 30 at high speed. This produces a Doppler shift in the signal frequency appearing at the photodetector 37. For example, with a 15-millimeter horizontal scan at conventional television scanning rates, the scanning velocity of the light beam on the substrate 30 is about 240 meters per second, or about 8 percent of a typical Rayleigh wave velocity (for steel surfaces) of about 3,000 meters per second. If the acoustic frequency $f_0$ from signal generator 32 is 8 megahertz, the corresponding Doppler shift is +640 kilohertz if the sound wave travels against the direction of the horizontal scan and −640 kilohertz if it travels in the same direction as the scan. The Doppler shift can assume intermediate values between these two extremes for waves traveling at different angles. Thus, the output signal from photocell 37 is of a Doppler-shifted frequency $f_0+f_D$, where the Doppler shift frequency $f_D$ can be either positive or negative in sign depending upon the relationship of the scanning direction to the direction of acoustic wave propagation on the substrate surface.

The output signal $f_0+f_D$ from photodetector 37 is applied to a high-gain selective amplifier 42 which is tuned to the acoustic frequency $f_0$ with a bandwidth sufficient to accept the Doppler frequency shifts $\pm f_D$. For example, if signal generator 32 provides an acoustic signal of frequency $f_0 = 8$ megahertz, high-gain selective amplifier 42 may be tuned to 8 megahertz with a 1-megahertz bandwidth and a broad or relatively low-Q tuning characteristic. This permits simultaneous observation, with some attenuation, of acoustic waves traveling in both directions relative to the scanning direction, and also permits emphasis of one or the other of the two waves by de-tuning signal generator 32 if desired.

After the acoustic signal $f_0+f_D$ has been filtered and amplified, it is applied to a mixer 43 which also receives an input signal $f_0$ from signal generator 32. The Doppler-shifted output signal $f_0+f_D$ from photodetector 37 is heterodyned in a mixer 43 with the original unshifted signal taken directly from signal generator 32. This produces an output signal at the Doppler frequency $f_D$ which is applied to the intensity control element of a television monitor 44. Monitor 44 is driven by sweep system 35, in synchronism with the laser scanner 34. This provides a stationary pattern on the television monitor screen, co-responding to a stroboscopic view of the traveling surface waves on substrate 30. The heterodyning process in mixer 43 may be though of as a synchronous detection process, in which the acoustic phase of each spot is compared to the reference phase supplied by the signal generator 32; as the scanning light beam sweeps over a sequence of spots, the output from the synchronous detector becomes positive or negative according to the local acoustic phase at each spot. Positive and negative outputs are then displayed as black and white on the television monitor.

The output signal from photodetector 37 is also applied to a low-gain video amplifier 45 with a passband, for example, from 1 to 4 megahertz. Video amplifier 45 is also connected to an intensity control element of TV monitor 44, and provides for the display of conventional video signals produced by grooves, edges, and other normally visible features of the substrate, to serve as a background upon which the surface wave patterns are superimposed. The optical resolution of the flying spot laser scanner limits the range of conventional video signals which the scanner generates to frequencies below 4 megahertz; all signals appearing within the passband of selective amplifier 42 are therefore of acoustic origin, as if the scanning beam were standing still.

By using a helium-neon laser with a total light flux of 10 to 20 milliwatts in the illuminated scanning raster, surface waves with an intensity as low as 1 microwatt per centimeter width, corresponding to surface wave amplitudes of the order of 0.1 Angstrom unit, can be visualized. Operation at even lower power levels may be obtained if the selectivity of amplifier 42 is increased (i.e., the passband narrowed) of if the light power of the flying spot laser scanner is increased. Photographic time exposures being out patterns which are too weak to be seen directly, because random noise averages out over the period of exposure, and are therefore useful to improve sensitivity.

If desired, knife edge 39 may be replaced by a slit perpendicular to the plane of the drawing to develop an output signal from photodetector 37 which is proportional to changes in focusing of the return beam 36. With such a slit or with the knife edge 39 as shown, the output signal is responsive only to surface wave components which are propagated in the plane of the drawing. As a further alternative, and if it is desired to visualize all components of the surface waves on substrate 30, the knife edge or slit may be replaced by a circular or square aperture of a size corresponding to the average diameter of the return beam 36 in the plane of intercepting element 39.

Additional discussion of the apparatus of FIG. 5, including photographic reproductions of typical surface wave visualization patterns produced by the apparatus, is presented in an article entitled "An Instrument for Making Surface Waves Visible" by R. Adler, A. Korpel, et al., in IEEE TRANSACTIONS ON SONICS AND ULTRASONICS, Volume SU-15, No. 3, July 1968, pages 157-161.

Figure 6:
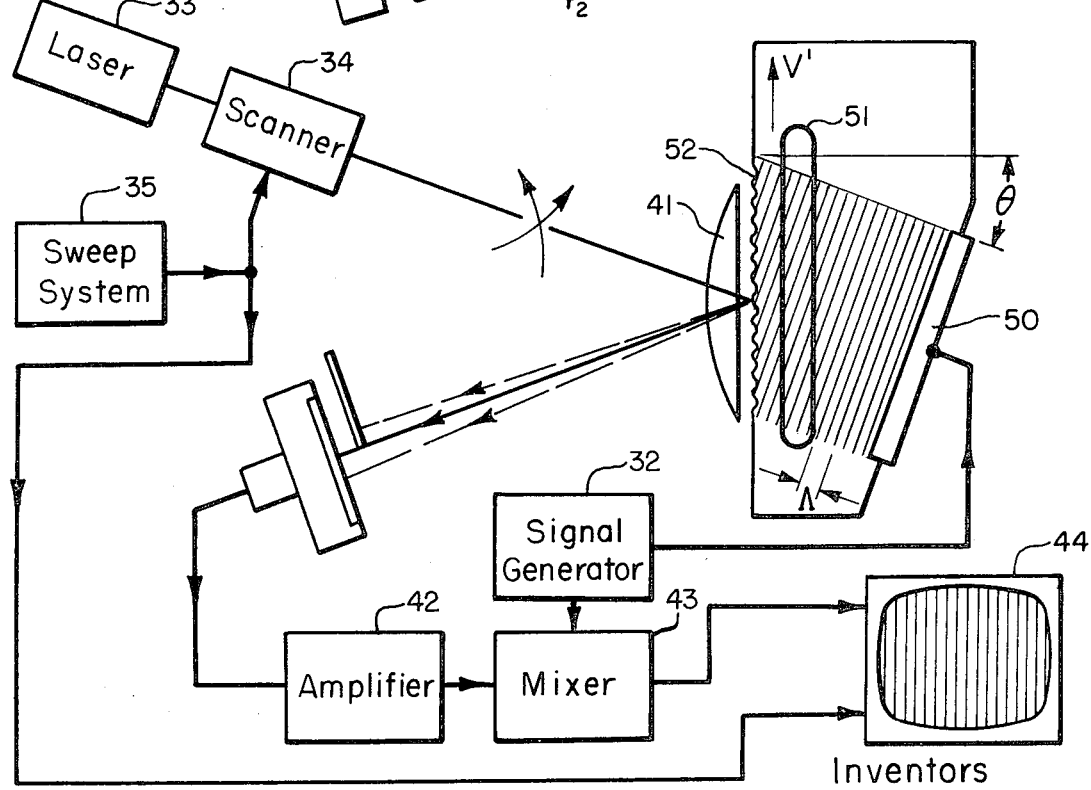
FIG. 6 is a schematic diagram of electro-optical apparatus which embodies the present invention and is adapted for the recording of acoustic holograms.

The detecting systems of the invention may also be employed in systems for recording acoustic holograms, as particularly taught in a copending application of Adrianus Korpel entitled METHOD AND APPARATUS FOR RECORDING ACOUSTIC IMAGES AND HOLOGRAMS, Ser. No. 763,676, filed concurrently herewith, which is assigned to the same assignee as the present application. As shown in FIG. 6, and described in greater detail in the copending Korpel application, the hologram recording apparatus is generally similar to the surface wave visualization apparatus of FIG. 5 except for the provision of a special transducer 50 which includes a solid block of acoustic bulk wave propagating material. This block is provided with a cavity 51 extending at an acute angle relative to the direction of propagation of sound waves. The cavity is open at the top and closed at the bottom, and is preferably filled with a liquid of an acoustic impedance matching that of the block of which transducer 50 is formed; alternatively, suitable impedance matching layers may be applied to the side walls of the cavity. The transducer 50 is provided with a forward surface 52 which is parallel to the cavity 51, and when an object to be visualized is placed inside the cavity, it scatters the incident sound beam and each plane wave in the angular spectrum of the scattered sound field causes its own characteristic ripple pattern on the surface of the block. This pattern is converted to a stationary pattern on the TV monitor 44 by apparatus corresponding to the surface wave visualization apparatus of FIG. 5, and the image reproduced by TV monitor 44 constitutes an acoustic hologram of the object inserted in cavity 51. The apparatus and its operation is described in greater detail in the above-identified copending Korpel application.

Thus the present invention provides new and improved optical detecting systems of general utility, and specifically provides for the use of such systems in surface wave visualization and acoustic holography. A sensitivity improvement of several orders of magnitude is achieved as compared with previous apparatus for surface wave visualization or detection.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. For use with a laser for generating a coherent light beam apparatus for detecting a characteristic of surface waves of predetermined acoustic wavelength on an object surface to be inspected, comprising:
    an optical system for focusing said light beam on said object surface to a spot smaller than said acoustic wavelength and for causing said light beam to obliquely scan said object surface transverse to said surface waves in accordance with a predetermined repetitive scanning pattern;
    output signal developing means including a photodetector and mask means having at least one edge in front of said photodetector for sensing variations in the lateral motion of light rays reflected obliquely from said object surface along a path which is inclined with respect to that of the incident scanning beam for developing an output signal;
    and optical means for imaging the exit pupil of said scanning system onto said output signal developing means.

2. For use with a laser generating a coherent light beam, apparatus for detecting a characteristic of surface waves of predetermined acoustic wavelength on an object surface to be inspected, comprising:
    an optical system for focusing said light beam on said object surface to a spot smaller than said acoustic wavelength and for causing said light beam to scan said object surface in accordance with a predetermined repetitive scanning pattern;
    and means including photodetecting means and mask means having at least one edge in front of said photodetecting means for sensing variations in the lateral motion of light rays reflected from said surface for determining a characteristic of said waves on said surface.

3. In combination:
    an ultrasonic transducer responsive to an applied electrical input signal for developing a field of acoustic vibrations in a predetermined surface plane;
    means including a flying spot laser scanner for scanning said surface plane with a collimated light beam;
    means responsive to variations in a predetermined characteristic of light reflected from said surface plane for developing an electrical output signal having a component dependent upon the acoustic vibrations in said surface plane;
    means for heterodyning said input and output signals;
    and means including an image display device coupled to said heterodyning means and synchronized to said flying spot laser scanner for generating a stationary visual display of said acoustic vibrations.

4. The combination of claim 3, in which said output signal developing means comprises a photodetector and an opaque element for detecting lateral motion in said reflected light beam.

* * * * *